ADAPTIVE NEURON HAVING IMPROVED OUTPUT

Filed Aug. 22, 1961 2 Sheets-Sheet 1

Inventor:
Juris Hartmanis,
by John P. Dellitt
His Attorney.

ADAPTIVE NEURON HAVING IMPROVED OUTPUT

Filed Aug. 22, 1961 2 Sheets-Sheet 2

Inventor:
Juris Hartmanis,
by John P. Dellitt
His Attorney.

United States Patent Office 3,103,648

Patented Sept. 10, 1963

3,103,648

ADAPTIVE NEURON HAVING IMPROVED OUTPUT

Juris Hartmanis, Scotia, N.Y., assignor to General Electric Company, a corporation of New York Filed Aug. 22, 1961, Ser. No. 133,186

10 Claims. (Cl. 340—172.5)

The present invention relates to neuron-like self-adapting circuitry and particularly to such circuitry whose output is indicative of the degree of confidence which the neuron places in the inputs thereof.

Neuron-like electrical networks have been proposed which are reportedly analogous in their operation to the operation of the human brain. Such networks involve layers of neuron-like elements driving further layers of neuron-like elements in an arrangement which may be initially random. The aim of the network is a self-organization or learning process so the network will come to consistently produce distinct outputs or resultants in response to different patterns of complex stimuli. As sets of stimuli repeatedly impinge upon the inputs of such a network, interconnecting paths tend to establish a response thereto so that different "events" represented by different sets of stimuli produce different and simplified outputs. After the learning period, the neuron-like network could, for example, become useful in solving character recognition problems and the like, or in other areas where adaptation from experience for producing some unique output is useful.

In the copending application of Charles V. Jakowatz, Serial Number 133,185, filed August 22, 1962, entitled "Self-Adapting Neuron," and assigned to the assignee of the present invention, being a continuation-in-part of a similarly entitled application of Charles V. Jakowatz, Serial Number 60,993, filed October 6, 1960, now abandoned, a simulated neuron and neuron-like network is set forth and claimed. In the Jakowatz circuit a plurality of parallel input stimuli are compared with a plurality of previously stored parallel input stimuli, and if the correlation therebetween exceeds a certain threshold value, an output is produced or increased. In a specific embodiment of the Jakowatz device, the neuron output (as well as input) comprises a series of pulses whose repetition rate indicates the signal or stimulus condition and the strength thereof. Also in a specific embodiment such input stimuli are integrated in the neuron inputs establishing a voltage related to the repetition rate of input stimuli. As further input stimuli tend to be like or agree with prior stimuli which have been stored, the new stimuli are averaged with the old in a learning process. Furthermore, as input stimuli have a high degree of correlation with the stored values, the threshold value which such correlation must exceed before a neuron output is produced is also raised. The neuron with a high threshold will produce a stronger output than one with the lower threshold.

Thus in the Jakowatz apparatus in the principal embodiment thereof an increasing output frequency is indicative of a coincidence of new stimuli with stored memory. The extent of the increase indicates the value of threshold "confidence level" or the degree of correlation between a present input and previously stored inputs. Alternatively a pulse magnitude instead of frequency can be employed to indicate such a degree of correlation. Although such a simulated neuron arrangement is sensitive to coincidence of a number of stimuli, it may be possible for it to miss correlating a number of somewhat sequential events which should be correlated and ought to be recognized to produce an output at some stage or level in a neuron-type network. For example, suppose an artificial neuron, or a network or sub-network of artificial neurons becomes organized to recognize a letter "t." Suppose another sub-network recognizes the letter "h" and a third, the letter "e" in succession. If the pattern t-h-e is repeated often enough, the next layer of the neuron network should come to recognize a coincidence consisting of the word "the" despite the sequential occurrence of the letters.

It is therefore an object of the present invention to provide an improved neuron-type device for producing an output indicative of the degree of confidence which the neuron has in the inputs thereof.

It is another object of the present invention to provide an improved neuron-type device in a neuron network which produces an output indicative of input strength and confidence and which output has a greater opportunity for registering coincidence or producing recognition in a subsequent neuron.

It is a further object of this invention to provide an improved neuron-type device and network wherein the stimuli are lengthened in accordance with the confidence placed therein.

In accordance with one embodiment of the present invention a plurality of first layer neuron-like elements are provided. Each of these first layer elements is responsive to a plurality of parallel inputs. Each neuron-like adaptive circuit includes a plurality of storage capacitors and a plurality of sampling capacitors. The inputs are continuously sampled by the sampling capacitors and when a high correlation exists between the voltages on the sampling capacitors and the voltages on the storage capacitors, switching means connect each of the sampling capacitors to a corresponding one of the plurality of storage capacitors. By performing this switching operation only when a high correlation exists between the inputs and the contents of storage, an increasingly better representation of repeated input is gradually built up on the storage capacitors. The correlation between the contents of storage and the sampled inputs is continuously compared to a threshold voltage which increases as "learning" proceeds. If the stimuli are strong and similar to storage, this threshold voltage becomes very high and a successively higher degree of correlation is required before the contents of the sampling capacitors are transferred into storage. This threshold voltage, then, is indicative of the correlation and the stimulus strength of the particular signals being recognized by that neuron-like element. These neuron-like elements produce an output each time the circuit recognizes an input, that is, each time that the contents of the sampling capacitors are transferred to the storage capacitors. The circuit produces an output indicating that this detection has been made. In accordance with the present invention this output is encoded in accordance with the confidence level of the detection. Since the threshold voltage stored in the circuit indicates the confidence level or correlation of this detection, this voltage is used to produce a pulse output starting at the time of the detection and having a time length in accordance with the level of the threshold voltage. That is, the output of the adaptive neuron-like circuit is a pulse having a time length which is a monotonically increasing function of the confidence level of the detection. The outputs of a plurality of such circuits may provide the inputs to a similar neuron-like circuit in the second level.

It will occur to those skilled in the art that my invention may take various forms. In its broader aspects my invention resides in providing a simulated neuron-type output whose length is a function of the quality of the inputs to the same neuron. The importance of encoding the output of each of the neuron-like elements is that if two of the adaptive neuron-like circuits are very confident in their detection of particular inputs then the output pulses of each circuit will be of relatively long duration. Thus, the probability of coincidence between these two outputs is increased and there is a high probability that these two detections will be associated in the next logical layer. Since the confidence level is high for events which occur frequently, this encoding facilitates the finding of correlation between such events. It should be recognized that the pulse length is also a function of the strength of input stimuli.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
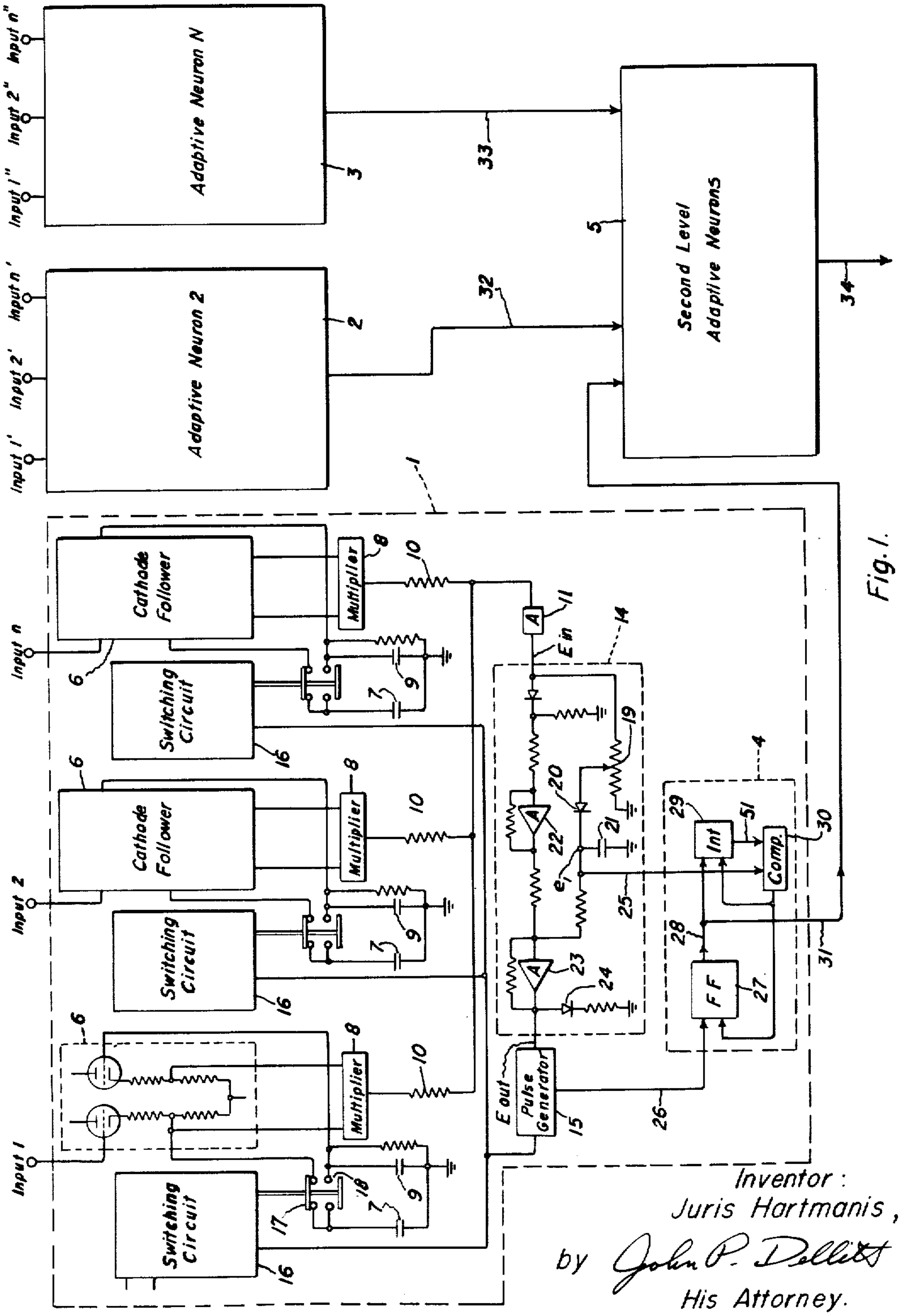
FIG. 1 is a schematic diagram of a neuron-like net.

Referring to FIG. 1 there are shown adaptive neurons 1, 2 and N. Each of these adaptive neurons are responsive to a plurality of inputs, the inputs to adaptive neuron 1 being labelled input 1, input 2 . . . input *n*; the input to adaptive neuron 2 being labelled input 1', input 2' . . . input *n'* and so on. These adaptive neurons are of the type shown and claimed in the copending application of Charles V. Jackowatz above mentioned, and include in addition the encoding circuits 4 which are connected in the outputs of each of the adaptive neurons. The encoding circuit 4 is shown only for the adaptive neuron 1 but a similar circuit is provided for each of the adaptive neurons 2 and N. The outputs of the encoding circuits of each of the first level nurons are connected to a neuron 5 in the second level.

Briefly, the operation of adaptive neurons 1, 2 and N is as follows. Input 1, input 2 . . . and input *n* are each applied through cathode follower circuits 6 to sampling capacitors 7. Each input is also continuously applied to one input of multipliers 8. A second input to the multipliers 8 is supplied from storage capacitors 9; the outputs of storage capacitors 9 being applied to the multipliers 8 through cathode follower circuits 6. The outputs of the multipliers, which are proportional, respectively, to the products of the voltages appearing on input 1, input 2 and input *n* and the voltages appearing on the corresponding storage capacitors 9, are connected together through resistors 10 so that a voltage indicative of the sum of the outputs of the multipliers is formed.

The common junction of the resistors 10 is connected to a direct current amplifier 11. The output of this amplifier is a function of the sum of the voltages appearing at the outputs of the multipliers 8, and when a maximum occurs in this voltage it is an indication that the sum of the products of the voltages appearing at the sampling capacitor 7 and the voltages previously stored on the storage capacitors 9 is a maximum. This voltage is indicative of the cross correlation between the stored and the sampled voltages.

The output of the amplifier 11 is supplied to a threshold detector, indicated generally as 14, which in turn provides a keying voltage pulse for a pulse generator 15 whenever the output of the amplifier 11 reaches a voltage which exceeds a predetermined fraction of the previous peak output of amplifier 11.

The pulse output of the pulse generator 15 is connected to energize switching circuits 16, each of which may comprise a thyratron operated relay. When these switching circuits are actuated, a set of normally closed contacts 17 open, and a set of normally open contacts 18, close. These contacts interrupt momentarily the connection of sampling capacitor 7 with the corresponding input and connect the sampling capacitor 7 with the corresponding storage capacitor 9 to bring the voltages on the two capacitors to a near-equilibrium condition. This operation takes place each time a maximum occurs in the correlation function. An adjustment of the voltage on the storage capacitor 9 is effected this way.

The operation and details of the threshold detector circuit 14 are as follows. The output of amplifier 11, designated $E_{in}$, is connected through variable resistor 19 and diode 20 to capacitor 21. This voltage charges capacitor 21 to a voltage designated $e_1$. The voltage $e_1$ is always indicative of the previous maximum of the voltage $E_{in}$ because the diode 20 prevents rapid discharge of capacitor 21. The voltage $e_1$ may correspond to the previous maximum of voltage $E_{in}$ or a predetermined fraction thereof depending upon the setting of the tap on resistor 19. Means may be provided to slowly discharge the voltage $e_1$ with time. The voltage $e_1$ is added to the inverted value of $E_{in}$ taken from the inverting amplifier 22. The result of this addition is again inverted by the inverting amplifier 23 and the output of this amplifier 23, designated $E_{out}$, is connected to the pulse generator 15. All positive values of the output of amplifier 23 are clipped by the clipping diode 24.

The pulse generator 15 includes a Schmitt trigger, the output of which goes positive when the voltage $E_{out}$ of the threshold detector goes negative. The output of the Schmitt trigger does not return to the zero level until the voltage $E_{out}$ returns to zero. The output of the Schmitt trigger is differentiated and the negative value is clipped from the output. The resultant output of the pulse generator is used to trigger the switching circuits 16.

The firing level of the threshold detector 14 and associated pulse generator 15 varies in accordance with the threshold voltage which is stored on the capacitor 21. As the similarity between the input voltages and the contents of the storages becomes greater the threshold voltage on the capacitor 21 increases correspondingly. The correlation between the input voltages and the sample voltages must then be correspondingly larger if it is to exceed this threshold level. Therefore, as the voltage on the storage capacitor becomes larger, that is as learning takes place, detection of coincidence with increasing confidence is indicated.

The voltage on the storage capacitor 21 is coupled over line 25 to the encoding circuit 4. The output of pulse generator 15 (of inverse polarity) is also connected, over line 26, to the encoding circuit 4. The encoding circuit 4 produces an output in response to the occurrence of a detection, that is, the occurrence of a pulse on line 26 and in accordance with an important feature of this invention, output of the encoding circuit 4 varies in accordance with the confidence level of this detection, that is, in accordance with the voltage on the line 25. A number of suitable circuits can be used for this purpose. However, in the illustrated embodiment a circuit is provided which produces an output pulse of unit height starting at the occurrence of the detection, and of a time duration proportional to the magnitude of the voltage on the line 25. The encoding circuitry 4 includes a flip-flop circuit 27 which is set by the pulse from the pulse generator 15. The output of flip-flop 27, taken from line 28, is integrated in the integrator 29, and provides an input to a comparator 30. The threshold voltage from the line 25 also provides an input to comparator 30. The comparator 30 produces an output when the output of the integrator 29 equals or exceeds the threshold voltage. This output from the comparator 30 is used to reset the flip-flop 27. The flip-flop 27, therefore, remains set, furnishing an output on line 31, for a period of time which is proportional to the magnitude of the threshold voltage on the line 25. The output of the comparator 30 also resets the integrator 29. The details of the encoding circuit 4 are illustrated in FIG. 2.

Figure 2:
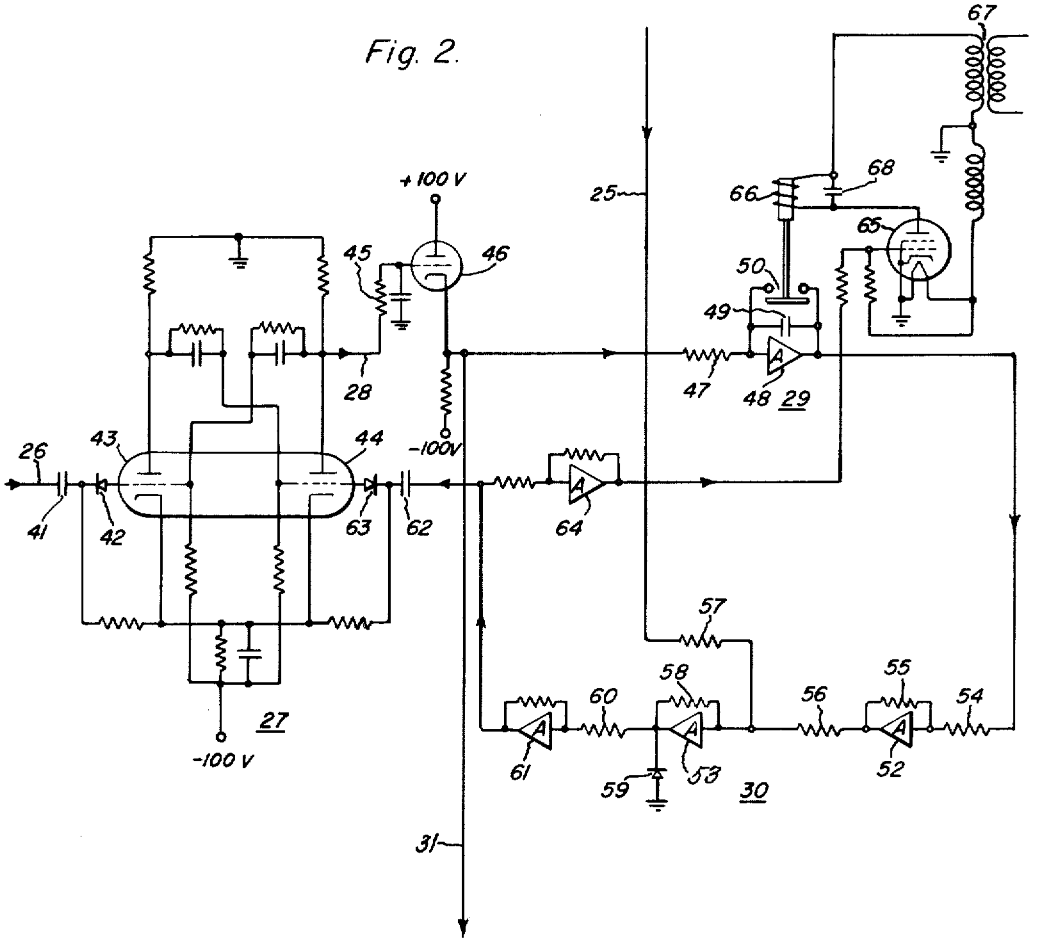
FIG. 2 is a schematic diagram illustrating portions of the encoding circuitry used in the output of each neuron-like circuit.

Referring to FIG. 2, line 26 from the pulse generator 15, line 25 from the threshold detector 14, and the output line 31 to the second level neuron 5 are designated with the same numerals as in FIG. 1. A differentiated negative pulse on the line 26 is coupled through an input capacitor 41 and a diode 42 to set the flip-flop including the two half-tube sections 43 and 44. The output of the flip-flop is connected through a resistor 45 to the grid of a cathode follower 46.

The output of the cathode follower is connected to a resistor 47 which, together with high gain D.C. amplifier 48 and capacitor 49, forms an operational amplifier type, or "Miller," integrator. The output of the amplifier 48 is given by:

$$V_{out}=\frac{1}{RC}\int_0^t V_{in}dt$$

where $V_{out}$ is the output of amplifier 48, $V_{in}$ is the output of cathode follower 46, R is the resistance of resistor 47, and C is the capacitance of capacitor 49.

Normally open contacts 50 act to reset the integrator. When these contacts are closed the capacitor 49 is discharged and the integrator is reset.

The output of the integrator, taken over the line 51, is connected to the comparator where this voltage is compared with the threshold voltage on the line 25. The comparator includes an operational amplifier difference circuit biased by means of a diode and followed by another high gain D.C. amplifier. The difference amplifier includes high gain D.C. amplifiers 52 and 53, and resistors 54, 55, 56, 57 and 58. Resistors 54, 55, 56, 57 and 58 are all of the same resistance value, for example, 1 megohm.

The output of amplifier 53 is clamped at ground potential by the diode 59 for negative outputs of amplifier 53. The output of this amplifier is connected through an input resistor 60 to a high gain D.C. amplifier 61.

The output of amplifier 53 is given approximately as:

$$V_{53}=V_{51}-V_{25}$$

where $V_{53}$ is the output of amplifier 53, $V_{51}$ is the integrated voltage on line 51 and $V_{25}$ is the threshold voltage on the line 25. As long as the threshold voltage, $V_{25}$, is greater than the integrated voltage, $V_{51}$, the output of amplifier 53 is clamped at ground potential by the diode 59. However, when the integrated voltage, $V_{51}$, equals or exceeds the threshold voltage, $V_{25}$, the output of amplifier 53 goes positive, thus driving the high gain D.C. amplifier 61 to saturation. D.C. amplifier 61 produces a negative output which is connected through coupling capacitor 62 and diode 63 to reset the flip-flop. The negative output of D.C. amplifier 61 is also used to reset the integrator. The output is connected through an inverting amplifier 64 to the grid of a thyratron 65 and initiates conduction of the thyratron 65 thereby energizing the relay 66 which closes the nomally open contacts 50 and resets the integrator.

A.C. voltage from the transformer 67 is applied to the plate of thyratron 65 so that the thyratron is extinguished on the negative plate cycle following conduction of the thyratron. The closure time of the relay 66 depends on the value of a capacitor 68 connected across the terminals of the relay. A .01 microfarad capacitor produces an acceptable closure time but increased closure time may be obtained with a larger capacitor.

Thus, the negative pulse output of amplifier 61 has reset the flip-flop and has reset the integrator. The output of the flip-flop, taken over line 31, is a pulse of unit height having a time duration which varies in accordance with the magnitude of the threshold voltage on the line 25.

Referring again to FIG. 1 and summarizing briefly the operation of the neuron net, a plurality of parallel inputs are applied to each of the adaptive neurons 1, 2 and N. These adaptive neurons recognize and store repetitive signals which are contained in these parallel inputs. Each time that the adaptive neuron 1 "recognizes" a signal of the type being stored in that neuron, an output is produced from the pulse generator 15. At this time, the magnitude of the voltage across the capacitor 21 in the threshold detector 14 indicates the degree of confidence in this detection. The adaptive neuron 1 produces an output over the line 31 which occurs at the time of detection and has a duration commensurate with the confidence of the detection. Similarly, the adaptive neurons 2 and N may at the same time be storing and recognizing a signal. The outputs of these neurons over lines 32 and 33 are pulse-like outputs occurring at the time of detection of the signal being recognized and of a duration commensurate with the confidence of the detection. The outputs of all adaptive neurons in the first level are connected to the adaptive neurons 5 in the second level. If the adaptive neurons in the first level are recognizing similar signals and if the confidence level of the detection is high, there is a good probability that the inputs 31, 32 and 33 to the second level adaptive neuron 5 will overlap. In this case, a second level adaptive neuron 5 produces an output over the line 34 indicating that parallel inputs to the system have high stimulus strength.

While a specific embodiment of my invention has been shown and described, it will, of course, be understood that various modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. An artificial neuron comprising input connections, storage means, threshold means for detecting a degree of comparison between electrical values in said storage means and on said input connections exceeding the threshold value, means for varying said threshold value in response to favorable comparison, and means for producing an output in response to favorable comparison having a duration which increases as a function of increased threshold value.

2. An artificial neuron capable of receiving a plurality of inputs and for producing an output as a function of said inputs exceeds a predetermined threshold value comprising means for raising said threshold value when a plurality of inputs applied to said neuron are similar to said prior applied inputs, means for extending the duration of said output in record with said threshold value to indicate the degree of confidence placed by said neuron in said inputs, and means for coupling the output of said neuron as an input to another such neuron so that an output indicating a high degree of confidence will have greater opportunity for producing coincidence with other inputs of the said other such neuron.

3. Electrical circuitry for successively receiving a plurality of inputs comprising threshold means for establishing a threshold value, said threshold means being responsive to a function of a first plurality of said inputs for producing an output of said neuron as said function exceeds said threshold value, said output having a duration responsive to the threshold value, means for raising said threshold value when said threshold value is exceeded so that the same function of a second plurality of inputs will tend to attain a higher value before said threshold value is again exceeded, whereby said output indicates the degree of confidence with which said output is produced.

4. An artificial neuron-type system comprising a simulated neuron device which device includes means for producing an indication as a function of neuron inputs exceeds a variable threshold value, and means responsive to said indication for producing a variable duration output wherein the duration is indicative of the extent to which the threshold was exceeded.

5. A neuron-like net for producing an output having a stimulus strength which varies in accordance with the stimulus strengths of a plurality of external parallel input signals comprising a plurality of first level neuron-like circuits, a plurality of second neuron-like circuits arranged in succeeding levels, each of said neuron-like circuits having means for recognizing and storing repetitive signals contained in said external inputs, said parallel external inputs being connected to said first level neuron-like circuits, the outputs of said first level neuron-like circuits being connected to the inputs to neuron-like circuits in succeeding levels, and means for encoding the output of each neuron-like circuit to indicate by its duration the stimulus strength of the inputs to said neuron-like circuit.

6. The neuron-like net recited in claim 5 wherein said encoding means includes a variable pulse width generator, said generator having means for producing a pulse of constant amplitude in response to the recognition of a signal by said neuron-like circuit, and means for varying the width of said pulse in accordance with the confidence level of said recognition.

7. A neuron-like net for producing an output having a stimulus strength which varies in accordance with the stimulus strengths of a plurality of parallel input signals comprising a plurality of first level neuron-like circuits and a plurality of second neuron-like circuits arranged in succeeding levels, said parallel inputs being connected to said first level neuron-like circuits, the outputs of said first level neuron-like circuits being connected to the inputs of neuron-like circuits in succeeding levels, each of said neuron-like circuits including a plurality of voltage sampling means, each of said sampling means being connected to sample a particular one of said plurality of parallel inputs, a plurality of voltage storage means, each of said storage means being associated with a particular input, correlation means for producing an output indicative of the correlation between the voltages in said storage means and the voltages in said sampling means, a threshold detector, the output of said correlation means being connected to the input of said threshold detector, said threshold detector producing an output when the input to said threshold detector reaches a peak which exceeds a threshold voltage indicative of a predetermined fraction of the previous peak input to said threshold detector, means connecting said sampling capacitor to said storage means in response to an output of said threshold detector, and means for encoding the output of each neuron-like circuit to indicate t' stimulus strength of the parallel inputs by its output duration.

8. The neuron-like net recited in claim 7 wherein said encoding means includes a variable pulse width generator, said generator having means for producing a pulse of constant amplitude in response to the output of said threshold detector and means for varying the width of said pulse in accordance with the magnitude of said threshold voltage.

9. The neuron-like net recited in claim 7 wherein said encoding means includes a variable pulse width generator, the output of said threshold detector being connected to said variable pulse width generator, said threshold voltage being connected to said variable pulse generator, said generator being triggered by said threshold detector output, said generator having means for controlling the width of said output pulse in response to the magnitude of said threshold voltage.

10. The neuron-like net recited in claim 7 wherein said encoding means includes a bistable circuit having a set and reset condition, the output of said threshold detector being connected to set said flip-flop, an integrator, the output of said bistable circuit being connected to said integrator, a comparator, said threshold voltage being connected to said comparator, the output of said integrator being connected to said comparator, said comparator producing an output when the output of said integrator exceeds said threshold voltage, the output of said comparator being connected to reset said bistable circuit and to reset said integrator, and wherein the output of said bistable circuit forms the output of said neuron-like circuit.

No references cited.